US012255723B2

(12) United States Patent
Jiao et al.

(10) Patent No.: US 12,255,723 B2
(45) Date of Patent: Mar. 18, 2025

(54) INFORMATION INTERACTION SYSTEM AND METHOD FOR HETEROGENEOUS DETECTION AND RECOGNITION DEVICES FOR LOW-ALTITUDE UNMANNED AERIAL VEHICLE (UAV)

(71) Applicants: Zhejiang University of Science & Technology, Hangzhou (CN); Genenkosy Intelligence Security Technology(Hangzhou) Co., Ltd, Hangzhou (CN)

(72) Inventors: Qingchun Jiao, Hangzhou (CN); Liqing Wang, Hangzhou (CN); Zhongliang Sun, Hangzhou (CN)

(73) Assignees: Zhejiang University of Science & Technology, Hangzhou (CN); Genenkosy Intelligence Security Technology (Hangzhou) Co., Ltd, Hangzhou (CN)

( * ) Notice: Subject to any disclaimer, the term of this patent is extended or adjusted under 35 U.S.C. 154(b) by 527 days.

(21) Appl. No.: 17/730,255

(22) Filed: Apr. 27, 2022

(65) Prior Publication Data

US 2022/0352975 A1 Nov. 3, 2022

(30) Foreign Application Priority Data

Apr. 29, 2021 (CN) .......................... 202110475853.0

(51) Int. Cl.
*H04B 7/185* (2006.01)
(52) U.S. Cl.
CPC .............................. *H04B 7/18502* (2013.01)

(58) Field of Classification Search
CPC ............ H04B 7/18502; G08G 5/0008; G08G 5/0013; G08G 5/0026; G08G 5/0082;
(Continued)

(56) References Cited

U.S. PATENT DOCUMENTS 6,177,903 B1 * 1/2001 Fullerton .............. G01S 13/878
  342/21
8,487,810 B2 * 7/2013 Grau Besoli ........... G01S 13/87
  342/134
(Continued)

FOREIGN PATENT DOCUMENTS

CN        209913833 U     1/2020
CN        111580083 A     8/2020

*Primary Examiner* — Ayaz R Sheikh
*Assistant Examiner* — Tarell A Hampton
(74) *Attorney, Agent, or Firm* — Bayramoglu Law Offices LLC

(57) ABSTRACT

An information interaction system and method for heterogeneous detection and recognition devices for a low-altitude unmanned aerial vehicle (UAV) are provided, where each edge data unit is connected to a uniquely corresponding low-altitude UAV detection and sensing device and an access and distribution unit. The access and distribution unit is connected to a storage service unit and at least one scheduling and calculation unit. Each scheduling and calculation unit is connected to a comprehensive calculation and display unit. The comprehensive calculation and display unit is connected to the storage service unit. The storage service unit sends historical data to the comprehensive calculation and display unit after being authorized. The method is applied to the information interaction system for heterogeneous detection and recognition devices for a low-altitude UAV. A problem of data collaborative application of different low-altitude UAV detection devices is resolved.

8 Claims, 2 Drawing Sheets

(58) Field of Classification Search
CPC ...... G08G 5/0069; H04W 4/029; H04W 4/40; H04W 28/065; H04W 48/08; H04W 64/00; G06F 16/29; H04L 67/025; H04L 67/1001; H04L 67/52; H04L 69/08; H04L 69/22

See application file for complete search history.

(56) References Cited

U.S. PATENT DOCUMENTS

| | | | |
|---|---|---|---|
| 8,712,686 B2* | 4/2014 | Bandyopadhyay | G01C 17/38 |
| | | | 701/445 |
| 9,860,677 B1* | 1/2018 | Agerstam | H04L 67/56 |
| 2003/0004689 A1* | 1/2003 | Gupta | H04L 63/1408 |
| | | | 702/188 |
| 2009/0224977 A1* | 9/2009 | Bonner | H04L 67/52 |
| | | | 342/385 |
| 2010/0205000 A1* | 8/2010 | Cho | H04W 4/02 |
| | | | 705/13 |
| 2010/0220653 A1* | 9/2010 | Hwang | H04W 40/22 |
| | | | 370/328 |
| 2016/0021344 A1* | 1/2016 | Renkis | H04L 67/10 |
| | | | 901/1 |
| 2016/0180719 A1* | 6/2016 | Wouhaybi | G08G 5/0082 |
| | | | 701/4 |
| 2017/0006089 A1* | 1/2017 | Felteau | H04W 4/70 |
| 2017/0270183 A1* | 9/2017 | Kuroda | G06F 16/211 |
| 2017/0358215 A1* | 12/2017 | Priest | G08G 5/0021 |
| 2018/0003816 A1* | 1/2018 | Olson | G01S 13/91 |
| 2018/0262270 A1* | 9/2018 | Maricic | H04W 4/30 |
| 2019/0230029 A1* | 7/2019 | Eswara | H04L 45/48 |
| 2021/0312818 A1* | 10/2021 | Kadavil | G08G 5/0034 |

* cited by examiner

INFORMATION INTERACTION SYSTEM AND METHOD FOR HETEROGENEOUS DETECTION AND RECOGNITION DEVICES FOR LOW-ALTITUDE UNMANNED AERIAL VEHICLE (UAV)

CROSS REFERENCE TO THE RELATED APPLICATIONS

This application is based upon and claims priority to Chinese Patent Application No. 202110475853.0, filed on Apr. 29, 2021, the entire contents of which are incorporated herein by reference.

TECHNICAL FIELD

The present disclosure relates to an information interaction system and method in the technical field of low-altitude aircraft defense, and in particular, to an information interaction system and method for heterogeneous detection and recognition devices for a low-altitude unmanned aerial vehicle (UAV).

BACKGROUND

Continuous civilization and popularization of low-altitude aircrafts such as small unmanned rotorcrafts, flying cars, and flying cargo boxes bring great risks while providing convenience. In particular, illegal flight intrusions into buildings with significant safety attributes need to be detected and handled in a timely manner. At present, there are many types of detection and recognition devices, such as detection radars, video detection, and other sensing means. However, there is large uncertainty when a single sensing device independently detects and senses a specific space domain. In terms of increasing detection accuracy and reliability, many types of devices are generally used for collaborative detection. For example, this solution is provided in Chinese Patent Application No. CN209913833U. Recognizing threat degrees of different flying objects based on sensing data is also an important technical field. For example, Chinese Patent Application No. CN111580083A relates to this field. However, due to differences in message content and formats of final output data of various heterogeneous products, cross-reuse or message review calculation of various heterogeneous detection and recognition devices cannot be implemented on an upper command platform. Therefore, an information interaction system and method for heterogeneous detection and recognition devices for a low-altitude UAV is needed to resolve a problem of data sharing.

SUMMARY

To resolve a problem of uniform data access and distribution for heterogeneous detection and recognition devices for a low-altitude UAV, the present disclosure provides an information interaction system and method for heterogeneous detection and recognition devices for a low-altitude UAV.

The technical solutions of the present disclosure are as follows:
1. Information Interaction System for Heterogeneous Detection and Recognition Devices for a Low-Altitude UAV The system includes a comprehensive calculation and display unit, scheduling and calculation units, an access and distribution unit, a storage service unit, edge data units, low-altitude UAV detection and sensing devices, and a transmission network.

Each of the edge data units is connected to the uniquely corresponding low-altitude UAV detection and sensing device, and is connected to the access and distribution unit through the transmission network, the access and distribution unit is connected to the storage service unit and at least one of the scheduling and calculation units through the transmission network, each of the scheduling and calculation units is connected to the comprehensive calculation and display unit through the transmission network, and the comprehensive calculation and display unit is connected to the storage service unit through the transmission network; and the storage service unit sends historical data to the comprehensive calculation and display unit through the transmission network after being authorized.

The low-altitude UAV detection and sensing devices have various types, each of the types includes a detection and sensing type and a manufacturer identity (ID), and each detection and sensing type has different manufacturer IDs such that the low-altitude UAV detection and sensing devices are heterogeneous in type.

Types of the scheduling and calculation units are the same as types of the low-altitude UAV detection and sensing devices.

2. Information Interaction Method for Heterogeneous Detection and Recognition Devices for a Low-Altitude UAV The method includes the following steps:

S1: setting a basic information configuration of the information interaction system;

S2: generating, by each of the low-altitude UAV detection and sensing devices, a sensing signal after detecting a low-altitude UAV, and sending the sensing signal to the corresponding edge data unit; and encapsulating, by each of the edge data units, the received sensing signal to generate a primary detection signal, and sending the primary detection signal to the access and distribution unit;

S3: parsing, by the access and distribution unit, the primary detection signal, and distributing a parsed primary detection signal to the corresponding scheduling and calculation unit;

selecting, by each of the scheduling and calculation units, the optimal low-altitude UAV detection and sensing device by using a scheduling algorithm based on the primary detection signal, and reversely requesting, by each of the scheduling and calculation units, a detailed low-altitude UAV sensing signal from the edge data unit corresponding to the selected low-altitude UAV detection and sensing device through the access and distribution unit; encapsulating, by the selected edge data unit, the received sensing signal to generate a secondary detection signal, and sending the secondary detection signal, calculating, by each of the scheduling and calculation units, a real-time location of the low-altitude UAV based on the secondary detection signal; and sending all primary and secondary detection signals to the storage service unit for storage; and S4: sending, by each of the scheduling and calculation units, the real-time location of the low-altitude UAV to the comprehensive calculation and display unit; and performing, by the comprehensive calculation and display unit, composite calculation on the real-time location of the low-altitude UAV to obtain a final real-time location of the low-altitude UAV, and displaying the final real-time location on a two-dimensional (2D) or three-dimensional (3D) spatio-temporal map.

The basic information configuration includes IDs, network internet protocol (IP) addresses, and connection ports of the comprehensive calculation and display unit, the scheduling and calculation units, the access and distribution unit, the storage service unit, the edge data units, and the low-altitude UAV detection and sensing devices, on which time calibration is performed based on a satellite navigation system, and detection and sensing types and longitude, latitude, and altitude information of the low-altitude UAV detection and sensing devices.

The edge data unit performs data encapsulation by using a uniform encapsulation format and implements information interaction with the access and distribution unit by using an edge data unit ID EDid, a detection and sensing type DPtype, and a manufacturer ID Pid as an identification mark.

A message obtained after the data encapsulation is performed by using the uniform encapsulation format includes status information Bsinfo of the low-altitude UAV detection and sensing device, status information EDinfo of the edge data unit, heartbeat information EDheart of the edge data unit, and result information BsResulInfo of the low-altitude UAV detection and sensing device or monitoring information EDResulInfo of the low-altitude UAV or monitoring data EDSPDataInfo of the low-altitude UAV.

The access and distribution unit performs data parsing based on a uniform encapsulation format to obtain a detection and sensing type DPtype and a manufacturer ID Pid, and distributes the received signal to the specified scheduling and calculation unit based on the detection and sensing type DPtype and the manufacturer ID Pid.

The access and distribution unit distributes the signal based on status information of the scheduling and calculation unit as follows: The access and distribution unit performs data translation on the manufacturer ID Pid of the received signal to obtain a signal of another manufacturer ID Pid to distribute the obtained signal to the specified scheduling and calculation unit.

When the edge data unit does not receive the sensing signal from the low-altitude UAV detection and sensing device, the edge data unit reports its own heartbeat information EDheart to the access and distribution unit based on first duration Timer1.

When the edge data unit receives the sensing signal from the low-altitude UAV detection and sensing device, the edge data unit does not send the heartbeat information EDheart, but encapsulates the received sensing signal to generate the primary detection signal and reports the primary detection signal to the access and distribution unit.

When the edge data unit receives the data acquisition request information RTReq from the access and distribution unit, the edge data unit encapsulates the received sensing signal based on second duration Timer2 to generate the secondary detection signal and reports the secondary detection signal to the access and distribution unit.

A classification configuration table of each of the scheduling and calculation units is pre-established in the comprehensive calculation and display unit, type identification is performed based on the detection and sensing type DPtype and the manufacturer ID of the scheduling and calculation unit according to the classification configuration table, an event information subscription mode is established between the comprehensive calculation and display unit and each of the scheduling and calculation units by using a uniform interface protocol of the transmission network such that each of the scheduling and calculation units sends the real-time location of the low-altitude UAV to the comprehensive calculation and display unit in real time, and the comprehensive calculation and display unit obtains the signal sent by the scheduling and calculation unit and performs data parsing based on the detection and sensing type DPtype and the manufacturer ID to obtain the final real-time location of the low-altitude UAV.

After being authorized, the comprehensive calculation and display unit calls the historical data stored in the storage service unit through the transmission network to perform data analysis, and calculates and displays a historical flight trajectory of the low-altitude UAV.

The present disclosure has the following beneficial effects:

The present disclosure resolves a problem of data collaborative application of different low-altitude UAV detection devices by establishing centralized access, processing and distribution of various UAV detection and sensing signals and performing data fusion and positioning to implement access and data transmission for various UAV detection and recognition devices.

The access and distribution unit provided in the present disclosure can translate protocol content of a same type but from different manufacturers by parsing the types of the detection and recognition devices, to calculate data to be transmitted to idle scheduling and calculation units of a same type but from different manufacturers, thereby improving use efficiency and a calculation speed of the device.

The present disclosure refines the low-altitude UAV detection devices, and the type of each of the low-altitude UAV detection device is composed of the detection and sensing type and the manufacturer ID to perform identification on the type so as to implement heterogeneity in type.

DETAILED DESCRIPTION OF THE EMBODIMENTS

Figure 1:
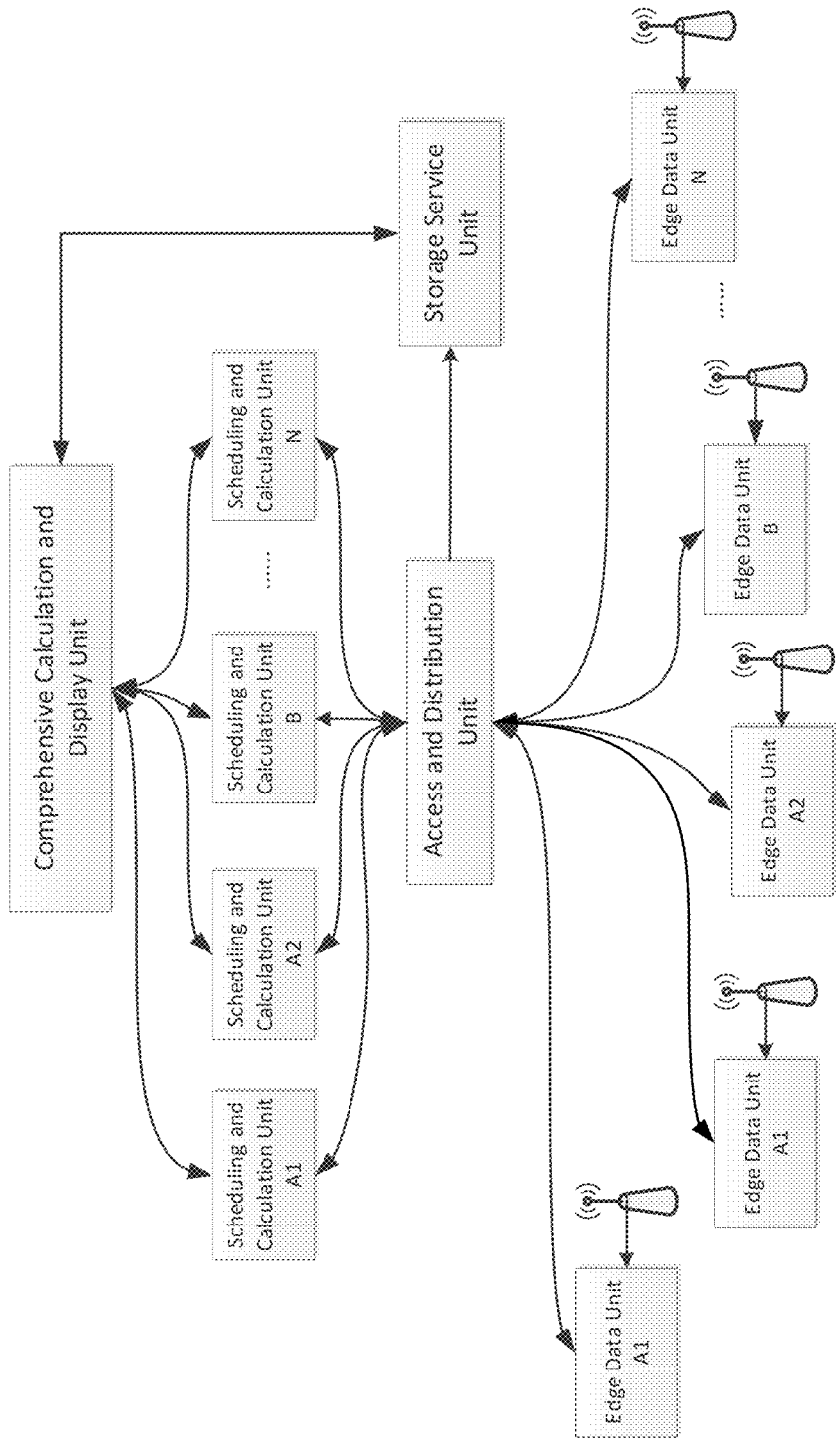
FIG. 1 is a schematic structural diagram of a system according to the present disclosure.
Figure 2:
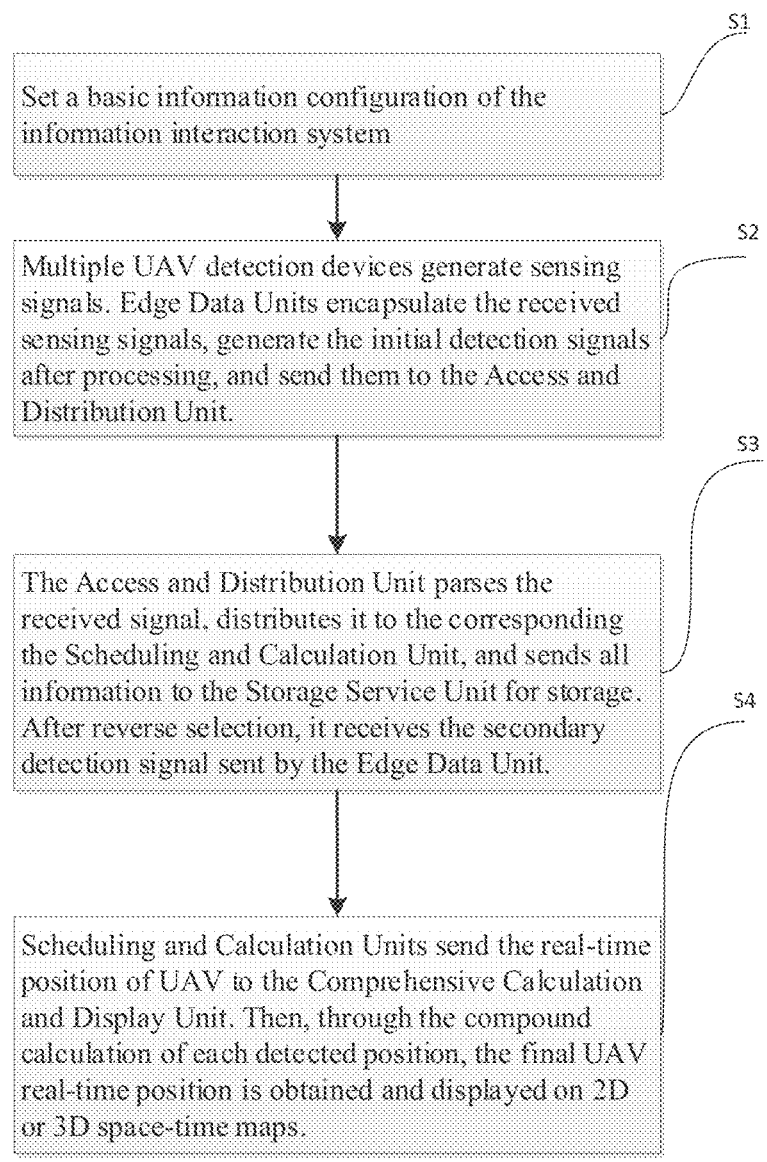
FIG. 2 is a flowchart of a method according to the present disclosure.

The present disclosure is described in further detail below with reference to the accompanying drawings and specific embodiments.

An information interaction system in the present disclosure is set based on types and a quantity of heterogeneous low-altitude UAV detection devices. The information interaction system includes a comprehensive calculation and display unit, scheduling and calculation units, an access and distribution unit, a storage service unit, edge data units, low-altitude UAV detection and sensing devices, and a transmission network.

Each of the edge data units is connected to the uniquely corresponding low-altitude UAV detection and sensing device, and is connected to the access and distribution unit through a remote data transmission network. The access and distribution unit is connected to the storage service unit and at least one heterogeneous scheduling and calculation unit through the transmission network. Each of the scheduling and calculation units is connected to the comprehensive calculation and display unit through the transmission network. The comprehensive calculation and display unit is connected to the storage service unit through the transmission network. The storage service unit sends historical data to the comprehensive calculation and display unit through the transmission network after being authorized.

The low-altitude UAV detection and sensing devices have various types. Each of the types includes a detection and sensing type and a manufacturer ID. The detection and sensing type is specifically sound sensing, radio sensing, video sensing, or the like. Each detection and sensing type has different manufacturer IDs. In this way, the low-altitude UAV detection and sensing devices are heterogeneous in type.

Types of the scheduling and calculation units are the same as types of the low-altitude UAV detection and sensing devices.

An information interaction method for heterogeneous detection and recognition devices for a low-altitude UAV includes the following steps:

S1: Set a basic information configuration of the information interaction system. The basic information configuration includes IDs, network IP addresses, and connection ports of the comprehensive calculation and display unit, the scheduling and calculation units, the access and distribution unit, the storage service unit, the edge data units, and the low-altitude UAV detection and sensing devices, on which time calibration is performed based on a satellite navigation system, and detection and sensing types and longitude, latitude, and altitude information of the low-altitude UAV detection and sensing devices.

Data of the edge data units is sensing signals of the low-altitude UAV detection and sensing devices. Sensing signals of low-altitude UAV detection and sensing devices of different detection and sensing types have different content.

S2: Each of the low-altitude UAV detection and sensing devices generates a sensing signal after detecting a low-altitude UAV, and sends the sensing signal to the corresponding edge data unit, and each of the edge data units encapsulates the received sensing signal to generate a primary detection signal and sends the primary detection signal to the access and distribution unit. The edge data unit performs data encapsulation by using a uniform encapsulation format and implements information interaction with the access and distribution unit by using an edge data unit ID EDid, a detection and sensing type DPtype, and a manufacturer ID Pid as an identification mark.

A message obtained after the data encapsulation is performed by using the uniform encapsulation format includes status information Bsinfo of the low-altitude UAV detection and sensing device, status information EDinfo of the edge data unit, heartbeat information EDheart of the edge data unit, and result information BsResulInfo of the low-altitude UAV detection and sensing device or monitoring information EDResulInfo of the low-altitude UAV or monitoring data EDSPDataInfo of the low-altitude UAV. A message containing the result information BsResulInfo of the low-altitude UAV detection and sensing device is the sensing signal from the low-altitude UAV detection and sensing device. A message containing the monitoring information EDResulInfo of the low-altitude UAV is the primary detection signal A message containing the monitoring data EDSPDataInfo of the low-altitude UAV is a secondary detection signal.

For example, the messages are transmitted over a persistent Transmission Control Protocol (TCP) connection, a message code for the status information Bsinfo of the low-altitude UAV detection and sensing device is 0x0000, a message code for the status information EDinfo of the edge data unit is 0x0000, a message code for the result information BsResulInfo of the low-altitude UAV detection and sensing device is 0x0002, and a message code for the monitoring data EDSPDataInfo of the low-altitude UAV is 0x0003.

The status information EDinfo is classified into an idle state, a faulty state, and a working state. The edge data unit sends the heartbeat information EDheart to the access and distribution unit at a specific time. The heartbeat information EDheart is parameter information of the edge data unit.

S3: The access and distribution unit parses the primary detection signal and distributes a parsed primary detection signal to the corresponding scheduling and calculation unit.

The scheduling and calculation unit selects the optimal low-altitude UAV detection and sensing device by using a scheduling algorithm based on the primary detection signal, and reversely requests a detailed low-altitude UAV sensing signal from the edge data unit corresponding to the selected low-altitude UAV detection and sensing device through the access and distribution unit. In other words, the access and distribution unit sends data acquisition request information RTReq to the edge data unit, and the selected edge data unit encapsulates the received sensing signal to generate a secondary detection signal and sends the secondary detection signal. Each of the scheduling and calculation units calculates a real-time location of the low-altitude UAV based on the secondary detection signal. All primary and secondary detection signals are sent to the storage service unit for storage.

The primary detection signal is a rough low-altitude UAV sensing signal, and the secondary detection signal is the detailed low-altitude UAV sensing signal. The primary detection signal is sent such that the scheduling and calculation unit selects the optimal low-altitude UAV detection and sensing device to prevent redundancy of the real-time location of the low-altitude UAV and overload of transmission and calculation of modules. The access and distribution unit performs data parsing based on the uniform encapsulation format to obtain a detection and sensing type DPtype and a manufacturer ID Pid, and distributes the received signal to the specified scheduling and calculation unit based on the detection and sensing type DPtype and the manufacturer ID Pid.

If there are a plurality of scheduling and calculation units with the same detection and sensing type and manufacturer ID Pid, the signal is simultaneously distributed to the plurality of scheduling and calculation units.

The access and distribution unit distributes the signal based on status information of the scheduling and calculation unit as follows: The access and distribution unit performs data translation on the manufacturer ID Pid of the received signal to obtain a signal of another manufacturer ID Pid to distribute the obtained signal to the specified scheduling and calculation unit.

When the edge data unit does not receive the sensing signal from the low-altitude UAV detection and sensing device, the edge data unit reports its own heartbeat information EDheart to the access and distribution unit based on first duration Timer1.

When the edge data unit receives the sensing signal from the low-altitude UAV detection and sensing device, the edge data unit does not send the heartbeat information EDheart, but encapsulates the received sensing signal to generate the primary detection signal and reports the primary detection signal to the access and distribution unit.

When the edge data unit receives the data acquisition request information RTReq from the access and distribution unit, the edge data unit encapsulates the received sensing signal based on second duration Timer2 to generate the secondary detection signal and reports the secondary detection signal to the access and distribution unit.

For example, Timer1 is 1 second and Timer2 is 1 second.

S4: Each of the scheduling and calculation units sends the real-time location of the low-altitude UAV to the comprehensive calculation and display unit, and the comprehensive calculation and display unit performs composite calculation on the real-time location of the low-altitude UAV to obtain a final real-time location of the low-altitude UAV, and displays the final real-time location on 2D and 3D spatio-temporal maps, where the composite calculation is averaging calculation.

A classification configuration table of each of the scheduling and calculation units is pre-established in the comprehensive calculation and display unit. Type identification is performed based on the detection and sensing type DPtype and manufacturer ID of the scheduling and calculation unit according to the classification configuration table. An event information subscription mode is established between the comprehensive calculation and display unit and each of the scheduling and calculation units by using a uniform interface protocol of the transmission network such that each of the scheduling and calculation units sends the real-time location of the low-altitude UAV to the comprehensive calculation and display unit in real time. In other words, when calculating an occurred event of flight data of the low-altitude UAV, the scheduling and calculation unit sends the event to the comprehensive calculation and display unit in real time. The occurred event of the flight data of the low-altitude UAV is specifically as follows: The low-altitude UAV is detected, the low-altitude UAV flies, and the low-altitude UAV disappears. The comprehensive calculation and display unit obtains the signal sent by the scheduling and calculation unit, and performs data parsing based on the detection and sensing type DPtype and manufacturer ID to obtain the final real-time location of the low-altitude UAV.

For example, in the event information subscription mode, an HTTP-based REST method is used to implement subscription to the flight data of the low-altitude UAV, and data is returned in the JSON format.

The real-time location of the low-altitude UAV includes basic attributes such as longitude, latitude, altitude, and time, flight attributes such as a speed, an angle, and acceleration, and extended attributes such as a type, a model, an image, and a radio signal feature of the low-altitude UAV.

After being authorized, the comprehensive calculation and display unit calls the historical data stored in the storage service unit through the transmission network to perform data analysis, and calculates and displays a historical flight trajectory of the low-altitude UAV.

What is claimed is:

1. An information interaction system for heterogeneous detection and recognition devices for a low-altitude unmanned aerial vehicle (UAV), comprising a comprehensive calculation and display unit, scheduling and calculation units, an access and distribution unit, a storage service unit, edge data units, low-altitude UAV detection and sensing devices, and a transmission network; wherein
   each of the edge data units is correspondingly connected to each of the low-altitude UAV detection and sensing devices, and each of the edge data units is connected to the access and distribution unit through the transmission network, the access and distribution unit is connected to the storage service unit and at least one of the scheduling and calculation units through the transmission network, each of the scheduling and calculation units is connected to the comprehensive calculation and display unit through the transmission network, and the comprehensive calculation and display unit is connected to the storage service unit through the transmission network; and the storage service unit sends historical data to the comprehensive calculation and display unit through the transmission network after being authorized, wherein the low-altitude UAV detection and sensing devices have various types, each of the various types comprises a detection and sensing type and a manufacturer identity (ID), and the detection and sensing type each has different manufacturer IDs, wherein the low-altitude UAV detection and sensing devices are heterogeneous in type; and
   types of the scheduling and calculation units are the same as types of the low-altitude UAV detection and sensing devices.

2. An information interaction method for heterogeneous detection and recognition devices for a low-altitude UAV, applied to the information interaction system according to claim 1 and comprising the following steps:
   S1: setting a basic information configuration of the information interaction system;
   S2: generating, by each of the low-altitude UAV detection and sensing devices, a sensing signal after detecting the low-altitude UAV, and correspondingly sending the sensing signal to the edge data unit; and encapsulating, by each of the edge data units, the sensing signal to generate a primary detection signal, and sending the primary detection signal to the access and distribution unit;
   S3: parsing, by the access and distribution unit, the primary detection signal, and correspondingly distributing a parsed primary detection signal to the scheduling and calculation unit;
   optimally selecting, by each of the scheduling and calculation units, one of the low-altitude UAV detection and sensing devices by using a scheduling algorithm based on the parsed primary detection signal, and reversely requesting, by each of the scheduling and calculation units, a detailed low-altitude UAV sensing signal from an edge data unit corresponding to a selected low-altitude UAV detection and sensing device through the access and distribution unit; encapsulating, by a selected edge data unit, the received detailed low-altitude UAV sensing signal to generate a detailed detection signal, and sending the detailed detection signal; calculating, by each of the scheduling and calculation units, a real-time location of the low-altitude UAV based on the detailed detection signal; and sending the primary detection signal and the detailed detection signal to the storage service unit for a storage; and
   S4: sending, by each of the scheduling and calculation units, the real-time location of the low-altitude UAV to the comprehensive calculation and display unit; and performing, by the comprehensive calculation and display unit, a composite calculation on the real-time location of the low-altitude UAV to obtain a final real-time location of the low-altitude UAV, and displaying the final real-time location on a two-dimensional (2D) spatio-temporal map or a three-dimensional (3D) spatio-temporal map.

3. The information interaction method according to claim 2, wherein the basic information configuration comprises IDs, network internet protocol (IP) addresses, and connection ports of the comprehensive calculation and display unit, the scheduling and calculation units, the access and distribution unit, the storage service unit, the edge data units, and the low-altitude UAV detection and sensing devices where a time calibration is performed based on a satellite navigation system, and detection and sensing types and longitude information, latitude information, and altitude information of the low-altitude UAV detection and sensing devices.

4. The information interaction method according to claim 2, wherein each of the edge data units performs a data encapsulation by using a uniform encapsulation format and each of the edge data units implements an information interaction with the access and distribution unit by using an edge data unit ID EDid, a detection and sensing type DPtype, and a manufacturer ID Pid as an identification mark; and a message obtained after the data encapsulation is performed by using the uniform encapsulation format comprises status information Bsinfo of each of the low-altitude UAV detection and sensing devices, status information EDinfo of each of the edge data units, heartbeat information EDheart of each of the edge data units, and result information BsResulInfo of each of the low-altitude UAV detection and sensing devices or monitoring information EDResulInfo of the low-altitude UAV or monitoring data EDSPDataInfo of the low-altitude UAV.

5. The information interaction method according to claim 2, wherein the access and distribution unit performs a data parsing based on a uniform encapsulation format to obtain a detection and sensing type DPtype and a manufacturer ID Pid, and the access and distribution unit distributes a received signal to a specified scheduling and calculation unit based on the detection and sensing type DPtype and the manufacturer ID Pid; and the access and distribution unit distributes the received signal based on status information of the scheduling and calculation unit as follows: the access and distribution unit performs data translation on the manufacturer ID Pid of the received signal to obtain a signal of another manufacturer ID Pid to distribute the obtained signal to the specified scheduling and calculation unit.

6. The information interaction method according to claim 2, wherein when each of the edge data units does not receive the sensing signal from each of the low-altitude UAV detection and sensing devices, each of the edge data units reports a heartbeat information EDheart of each of the edge data units to the access and distribution unit based on a first duration Timer1;

when each of the edge data units receives the sensing signal from each of the low-altitude UAV detection and sensing devices, each of the edge data units does not send the heartbeat information EDheart, each of the edge data units encapsulates the received sensing signal to generate the primary detection signal and each of the edge data units reports the primary detection signal to the access and distribution unit; and when each of the edge data units receives a data acquisition request information RTReq from the access and distribution unit, each of the edge data units encapsulates the received sensing signal based on a second duration Timer2 to generate the detailed detection signal and each of the edge data units reports the detailed detection signal to the access and distribution unit.

7. The information interaction method according to claim 2, wherein a classification configuration table of each of the scheduling and calculation units is pre-established in the comprehensive calculation and display unit, a type identification is performed based on a detection and sensing type DPtype and a manufacturer ID of each of the scheduling and calculation units according to the classification configuration table, an event information subscription mode is established between the comprehensive calculation and display unit and each of the scheduling and calculation units by using a uniform interface protocol of the transmission network, wherein each of the scheduling and calculation units sends the real-time location of the low-altitude UAV to the comprehensive calculation and display unit in real time, and the comprehensive calculation and display unit obtains a signal sent by each of the scheduling and calculation units and the comprehensive calculation and display unit performs a data parsing based on the detection and sensing type DPtype and the manufacturer ID to obtain the final real-time location of the low-altitude UAV.

8. The information interaction method according to claim 2, wherein after being authorized, the comprehensive calculation and display unit calls the historical data stored in the storage service unit through the transmission network to perform a data analysis, and the comprehensive calculation and display unit calculates and displays a historical flight trajectory of the low-altitude UAV.

* * * * *